United States Patent

[11] 3,631,792

[72] Inventor Albert G. Bodine
7877 Woodley Avenue, Van Nuys, Calif. 91406
[21] Appl. No. 46,107
[22] Filed June 15, 1970
[45] Patented Jan. 4, 1972

[54] SONIC INTERNAL COMBUSTION ENGINE EXHAUST AFTERBURNER
7 Claims, 3 Drawing Figs.

[52] U.S. Cl. ............................................. 60/30 R,
23/277 C, 23/288 F, 55/DIG. 30, 55/292, 55/461, 60/32 R, 134/1
[51] Int. Cl. ........................................... F02b 75/10, F01n 7/10
[50] Field of Search ........................................ 60/30 R, 29, 32 R, 32 M; 23/277 C, 288 F; 134/1; 55/DIG. 30, 15, 277, 292, 461

[56] References Cited
UNITED STATES PATENTS

| | | | |
|---|---|---|---|
| 2,796,734 | 6/1957 | Bodine, Jr. ................. | 60/39.77 |
| 2,825,202 | 3/1958 | Bertin et al. ................ | 60/29 UX |
| 3,201,338 | 8/1965 | Pennington ................ | 55/277 X |
| 2,796,735 | 6/1957 | Bodine, Jr. ................. | 60/263 X |
| 3,534,547 | 10/1970 | Mebes ......................... | 60/30 R |
| 3,053,773 | 9/1962 | Calvert ....................... | 23/288 F UX |
| 1,958,577 | 5/1934 | Hirshfeld .................... | 55/461 X |
| 3,419,892 | 12/1968 | Wagner et al. .............. | 60/30 |
| 3,434,280 | 3/1969 | Burkhart .................... | 60/32 |

*Primary Examiner*—Allan D. Herrmann
*Attorney*—Sokolski & Wohlgemuth

ABSTRACT: An internal combustion engine exhaust afterburner utilizes a valveless catalytic combustor in which acoustic resonant combustion is maintained, using the exhaust effluents of the engine. The sound wave action aids in keeping the catalytic surfaces clean by scrubbing action, the catalyst aiding in maintaining a resonant combustion.

PATENTED JAN 4 1972
3,631,792
SHEET 1 OF 2
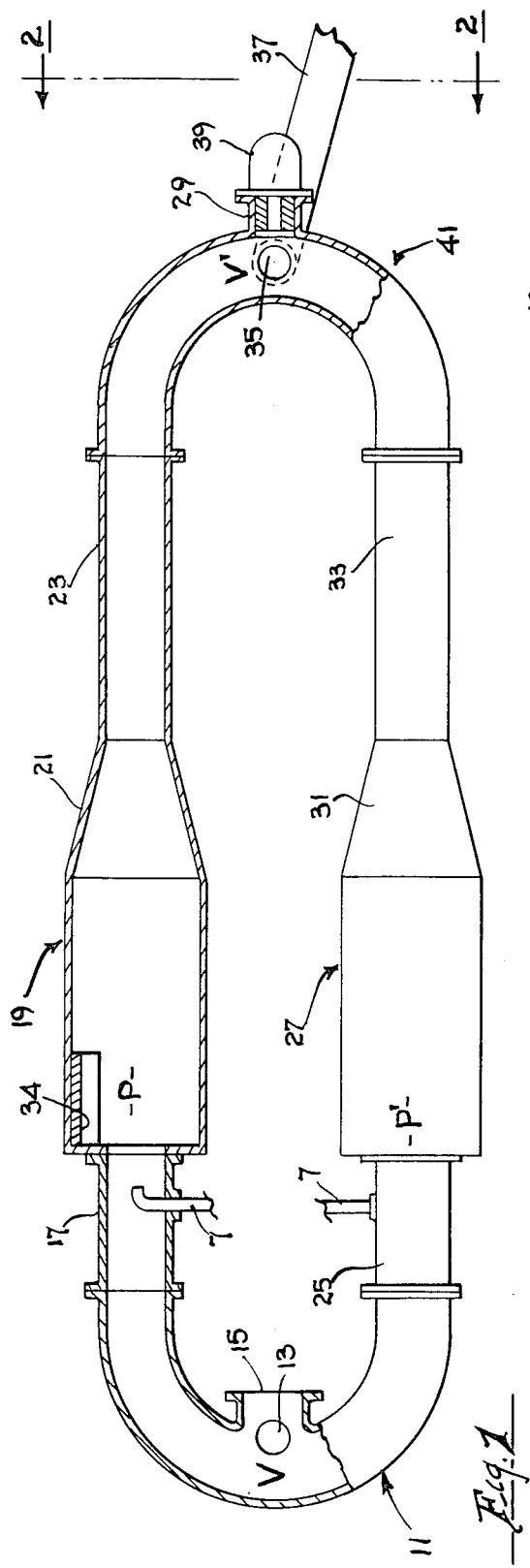
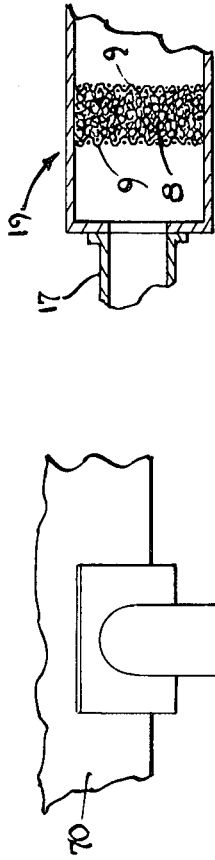
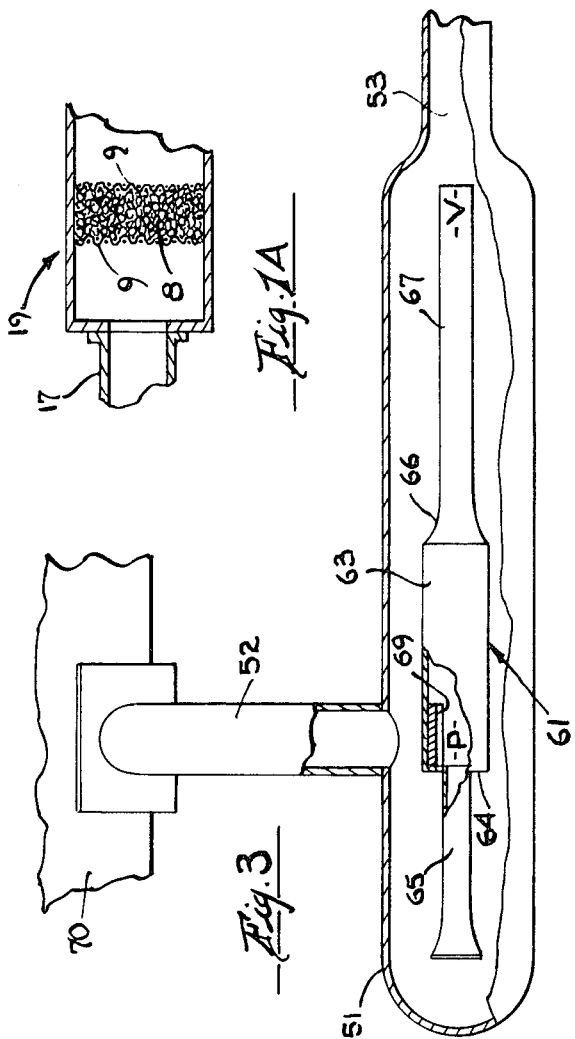
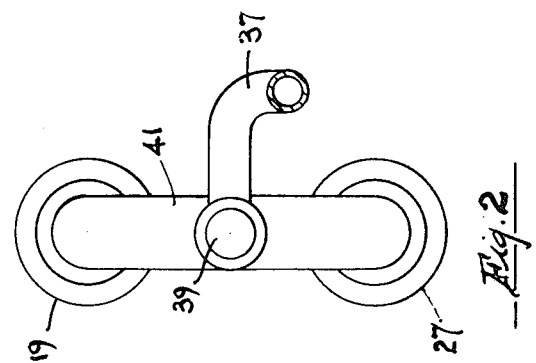
INVENTOR
ALBERT G. BODINE
BY
SOKOLSKI & WOHLGEMUTH
ATTORNEYS

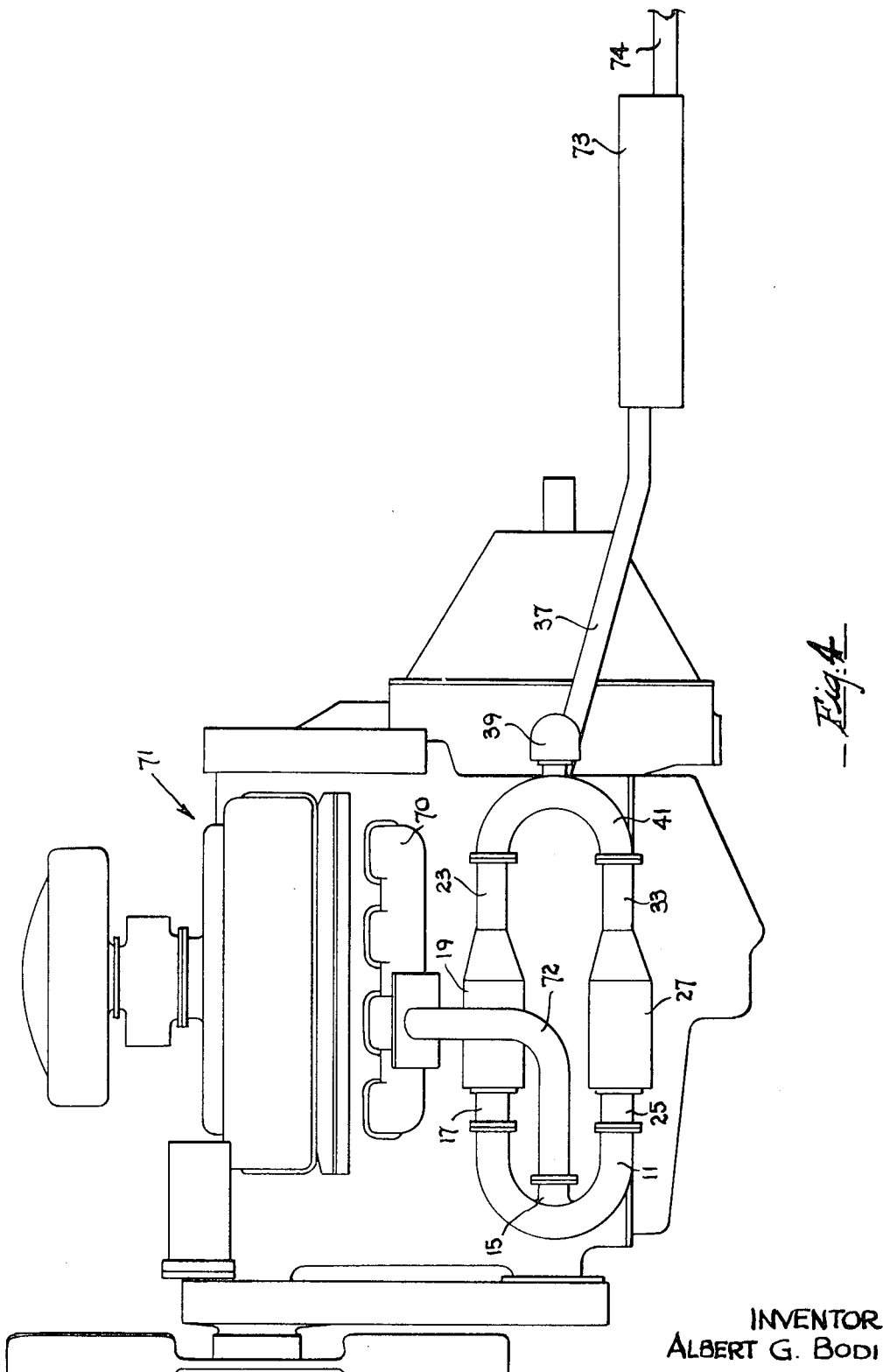

SONIC INTERNAL COMBUSTION ENGINE EXHAUST AFTERBURNER

This invention relates generally to catalytic exhaust afterburner for internal combustion engines and more particularly to such an afterburner utilizing a combustor employing sonic wave action in its operation.

The exhaust products of internal combustion engines contain contaminants resulting from incomplete combustion, from the dissociation of various chemical components involved in the combustion process and certain fuel components or additives which are not intended to undergo the combustion process. Catalytic afterburning devices have been utilized to aid in completing the combustion of many components of the exhaust products. Some of these devices are capable of operating with only the excess oxygen in the mixture coming from the engine. In other devices, excess air must be introduced into the combustor by another source, such as an air pump. A major shortcoming of the catalytic type of afterburner is that various components of the exhaust gas tend to contaminate the catalytic surfaces, thereby greatly reducing the effectiveness of the combustor, and requiring periodic servicing or replacement of the catalytic surface.

This invention overcomes the aforementioned shortcomings by employing a standing sound wave combustor conduit, maintained in acoustic resonance at least in part by the contaminant combustion process itself, in which the sound wave process causes scrubbing and pressure fluctuations on the surface of the catalyst, so as to remove contaminants therefrom.

One embodiment of the invention uses as an element thereof the valveless sonic combustor described in my patent U.S. Pat. No. 2,796,735, to which is added a catalytic material typically at or near the high-impedance region of the resonantly vibrating conduit. Since certain types of catalysts respond better to high-gas flow activation than to high-pressure fluctuation, the precise composition of the catalyst will determine its exact location between the pressure antinode and the velocity antinode. The resonant combustion itself is greatly aided by the catalytic process since the combustion process relies upon the proximity of the reacting material to the catalytic surface. The standing sound waves in the combustor remove boundary layers clinging to the catalytic surface, so that the catalytic reaction can proceed at a high rate. On each positive pressure pulse the rate of reaction is greatly increased, causing the pressure to be driven to higher values, by virtue of the momentary higher density of reagents in the vicinity of the catalyst.

A very important additional unexpected feature of this novel combination can be realized by those embodiments having open communication between the exhaust port of the engine and the sonic combustor. The exhaust pressure pulses from the engine aid in exciting and maintaining, by shock excitation, the resonant combustion process. It is not necessary that the frequency of the exhaust port pulses correspond to the resonant frequency of the catalytic combustor, because the resonant combustion will initiate and continue at the natural resonant frequency of the combustor when aided or excited by an occasional jolt from the engine exhaust. This excitation is a considerable aid if the fuel air mixture in the combustor is marginal.

A further advantage gained by embodiments utilizing curved resonant conduits is the centrifugal pumping effect of the curved sections near the antinodes, as fully described in applicant's patent U.S. Pat. No. 2,796,735. The auxiliary pumping effect tends to suck in the exhaust gas and provide reduced back pressure on the exhausting of the engine, with commensurate improvement in engine operation. This also makes practical the use of effective engine noise mufflers; even those of the type which create back pressure. Of considerable benefit is the ability of certain embodiments to suck outside air, thereby aiding in the combustion of incompletely burned hydrocarbon contaminants in the exhaust gas. The centrifugal pumping effect may also be utilized to centrifuge the exhaust products, thereby tending to throw solid or heavy components to the outside of the curved path. In this manner, particulate components as well as free metals and metal compounds such as lead antiknock materials can be fully separated from the exhaust gas and trapped in a container from which they may be periodically removed if so desired.

It is therefore the principal object of this invention to provide an improved engine exhaust combustor for removing contaminants from the combustion products of internal combustion engines before exhausting to the atmosphere.

Other objects and advantages of the invention will be apparent from the following detailed description taken in connection with the accompanying drawings, of which:

FIG. 1 is a partially sectioned elevational view of a preferred embodiment of the invention utilizing curved resonant conduits.

FIG. 1A is a fragmentary sectional view of an alternative combustion chamber which may be used with the embodiment of FIG. 1.

FIG. 2 is an end view of the embodiment shown in FIG. 1.

FIG. 3 is a partially sectioned view of a second embodiment of the invention, and FIG. 4 is an elevational view illustrating the embodiment of FIG. 1 as incorporated into an engine.

It has been found most helpful in analyzing the device of this invention to analogize the acoustically vibrating circuit utilized to an equivalent electrical circuit. This sort of approach to analysis is well known to those skilled in the art and is described, for example, in Chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R and mechanical impedance $Z_e$.

Thus, it can be shown that if a vibratory system is vibrated by means of an acoustical sinusoidal force $F_o \sin \omega t$ ($\omega$ being equal to $2\pi$ times the frequency of vibration), that $$Z_m = R_m + j\left(\omega M - \frac{1}{\omega C_m}\right) = \frac{F_o \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is more efficiently delivered to a load to which the resonant system may be coupled.

It is important to note the significance of the attainment of high-acoustical "Q" in the resonant system being driven, to increase the efficiency of the vibration thereof and to provide a maximum amount of power. As for an equivalent electrical circuit, the "Q" of an acoustically vibrating system is defined as the sharpness of resonance thereof and is indicative of the ratio of the energy stored in each vibration cycle to the energy used in each such cycle. "Q" is mathematically equated to the ratio between $\omega M$ and $R_m$. Thus, the effective "Q" of the vibrating system can be maximized to make for highly efficient, high-amplitude vibration by minimizing the effect of friction in the system and/or maximizing the effect of mass in such system.

In considering the significance of the parameters described in connection with equation (1), it should be kept in mind that the *total* effective resistance, mass, and compliance in the acoustically vibrating system are represented in the equation and that these parameters may be distributed throughout the system rather then being lumped in any one component or portion thereof.

Briefly described, the device of this invention comprises an afterburner forming an acoustically resonant vibration system which includes combustion chamber means having catalytic surfaces therein and coupled to inlet and outlet conduits. The inlet conduit has an inlet port for the introduction of exhaust gases from an engine while the outlet conduit has an outlet port for the discharge of engine exhaust gases after the recombustion thereof. The sonic energy acts to keep the catalytic surfaces clean by sonic scrubbing action, the catalyst aiding in maintaining resonant combustion.

With reference to the first embodiment of FIGS. 1 and 2, acoustic wave conduit 11 is in the form of a hollow U-tube of circular cross section. The conduit, which may consist of a heat-resistant metal pipe, has on its inside or concave surface, an exhaust inlet 15, to which the exhaust pipe of an internal combustion engine manifold may be attached as shown in FIG. 4.

Affixed to the ends of U-tube 11 are two equal pipe sections 17 and 25 of appropriate length to establish a sonic standing wave pattern in the gas column in the U-tube. Supplemental fuel introduction pipes 7 may be flange fitted as shown through the sidewalls of pipes 17 and 25. Pipe section 17 feeds into a cylindrical combustion chamber 19 having a conical aftersection 21, and a cylindrical tail section 23. An identical combustion chamber 27 having a conical aftersection 31 and tailpipe 33 section is fitted to pipe section 25. The combustion chambers both have a catalytic material 34 on the inner surfaces thereof which is capable of aiding the combustion of contaminants in the exhaust, as is well known in the art. Alternatively as shown in FIG. 1A, the catalyst can be a bed of granules 8 held in place by screens 9. The outlet ends of tail pipe sections 23 and 33, are secured to an acoustic wave conduit 41, in the form of a U-tube, having an outlet port 35 formed intermediate the concave and convex walls of the U-tube, to which an outlet pipe 37 is attached. A short pipe element 29 is formed into the outside or convex surface of tube 41, and a particle trap 39 for trapping solid particles is connected thereto.

A resonant sonic standing wave pattern is established in the conduit in the same general manner as in the acoustic jet engine disclosed in my U.S. Pat. No. 2,796,735 dated June 25, 1957 which is incorporated herein by reference, the resonant oscillation of the gases being excited by exhaust pressure pulses from the engine exhaust. A velocity antinode of the standing wave, (i.e., the region of maximized gas particle oscillatory velocity) appears in the region of each of valveless ports 13 and 35, as indicated by "V" and "V' in FIG. 1A pressure antinode, (i.e. a region of maximized gas oscillatory pressure) as indicated by "P" and "P" in FIG. 1 appears at each of the combustion chambers 19 and 27.

In the operation of the device, exhaust gas from an internal combustion engine enters the U-tube 11 at inlet 15, and travels therearound toward the outlet 35 under pumping forces to be presently explained. Combustion of the engine exhaust products is achieved in the combustion chambers 19 and 27 by means of the catalytic material 8 therein of 34 on the inner surfaces thereof. Under certain conditions combustion may rely upon the excess oxygen in the mixture coming from the engine. In other instances air is introduced to the combustors by means of fresh air port 13 located in the vicinity of the velocity antinode, V. Due to the symmetry of the device, resonant combustion will be initiated in the combustion chambers 19 and 27, in such manner that the acoustic vibrations generated by the combustion in chamber 19 are 180° out of phase with the acoustic vibrations generated by the combustion in chamber 27, the two combustion chambers operating in a "push-pull" oscillator-type manner. Assuming ignition at zone "P" coincident with each pressure peak at "P," pressure antinodes (zones of maximum fluid pressure variation) will appear at zones P and P'. Halfway between the pressure antinodes, at the locations of inlet 15 and outlet 35 will be velocity antinodes V and V' (zone of maximum fluid velocity variation). An acoustic standing wave is thus established around the conduit, with velocity antinode zones V and V' at inlets 15 and outlet 35 respectively, and with a pressure antinode P located in combustion chamber 19, and a pressure antinode P' in combustion chamber 27, located symmetrically with reference to pressure antinode P. It will be seen that with such timing of the combustion system, the conduit is effectively an acoustical half wave in length from the zone P around to zone P', and a quarter wave in length from the inlet 15 and outlet 35 to each of zones P and P' respectively. A greater distance from P to P' through V' as compared with through V is due to the greater speed of sound in the hotter gases in this first-mentioned path.

Considering the fluid velocity zones V and V' it can be seen that high alternating velocities in the region V will be produced by virtue of the alternating nature of the combustion process involved. The high velocities are achieved through the curved zones V and V' twice during each cycle of the wave. Due to the curvature of the zones V and V' and the consequent inward deflection of the fluid by the outer peripheral walls of the U-tubes substantial centrifugal forces are set up in the fluid causing it to be crowded radially outward toward the outer peripheral walls, and thereby establishing a substantial pressure differential in the radial direction across the U-tubes at zones V and V'. This pressure differential creates a pressure depression at the inner walls, and hence exhaust gas inlet 15 and fresh air port 13, with the result that exhaust gas as is sucked into the system through inlet 15 and fresh air is sucked into the system through port 13. This pressure differential also creates an elevated pressure at the outer wall and hence at outlet 35 so that fluid in the system is discharged at 35. Fluid is thus pumped through the system by the combined action of the standing wave set up in the system and the development of flow-inducing centrifugal forces. The device is therefore capable of pumping fresh air into the system without the use of valves or auxiliary air pumps. In addition, a pumping effect is created for the engine exhaust gas flow, thereby reducing back pressure on the exhausting of the engine.

The resonant combustion causes a standing sound wave to be maintained in the system, thereby causing substantial pressure fluctuations on the surface of the catalyst. By locating the catalytic material at or near the high-impedance region of the resonant combustion process, the pressure fluctuations on the surface thereof may be sufficient to keep the catalytic surface free from contaminants by virtue of sonic scrubbing action. Often the sonic cleaning can be aided by locating the catalyst in a region that is intermediate the pressure antinode and the velocity antinode. If a catalyst is used which responds to high-gas flow activation, such catalyst can be located even closer to the velocity antinode.

The resonant condition also aids in maintaining the catalytic combustion. A catalytic process relies upon the proximity of reacting material to the catalytic surfaces. Because the standing sound waves remove the boundary layers clinging to the catalyst, the chemical reaction can proceed at a higher rate. The catalytic combustion is also aided by the exhaust pressure pulses from the engine which act to shock excite the combustion even though the exhaust pulses may not be at the resonant frequency of the system.

An additional benefit of the curved conduit section 41 is the strong centrifugal effect of the high oscillating velocity of the antinode gases, strongly tending to throw solid or heavy components to the outside of the curved path as in a centrifuge. In this manner various particulate components, such as unburned carbon, as well as free metal and metal compounds (such as lead antiknock materials) can be fully separated from the exhaust gas before discharge into pipe 37. These materials are trapped in solid particle trap 39 for periodic removal or retention in the trap.

Referring now to FIG. 3, there is shown a second embodiment of the invention utilizing a nonpumping or straight pipe form of resonant catalytic combustion.

An exhaust gas inlet pipe 52 conducts the products of combustion from the engine exhaust manifold 70 into cylindrical housing 51 which may be formed of a heat-resistant metal. The housing has an opening 53 at one end through which the gases leave the housing. Supported within the housing 51 is a sonic burner heat engine designated 61, which is basically similar to the device disclosed in my U.S. Pat. No. 2,796,734 issued June 25, 1957, which is incorporated herein by reference and made a part hereof. The sonic burner 61 comprises a burner pipe such as is now conventional in pulse jet engines, having a forward combustion chamber 63 with head wall 64, and a tapered section 66 leading to a reduced tailpipe 67 open at its rearward end for discharge of combustion gases. A valveless intake pipe 65 is connected through head wall 64 into the combustion chamber 63. The inner wall of combustion chamber 63 has a catalytic material 69 thereon. Alternatively a bed of catalytic granules may be disposed within the chambers 63 and 67, as shown in FIG. 1A for the first embodiment. The characteristic feature of the sonic heat engine 61 is the use of a resonant acoustic cavity through which a fluid stream passes, and in which there is a combustion chamber region wherein fuel is periodically burned at a resonant frequency of the cavity to establish and maintain an acoustic standing wave. The fuel in this case consists of unburned hydrocarbon products in the exhaust gas from the internal combustion engine, and the ignition is provided by the catalytic material 69. This nonpumping embodiment is intended for applications where the exhaust products contain sufficient excess oxygen to support combustion, and no additional outside air need be supplied. A principal advantage of this embodiment in common with the first embodiment is the benefit of the sound wave action continuously cleaning the surfaces of the catalytic material.

In the operation of this embodiment, exhaust products from the internal combustion engine enter the housing 51 through pipe 52, and are sucked through inlet tube 65 into the resonant combustion chamber 63 wherein combustion is initiated and maintained by means of the catalytic surface 69. The combustion chamber is located at the pressure antinode region of the standing wave vibration pattern since energy for excitation of the standing wave vibration can best be extracted from the combustion flame at a pressure antinode. The acoustic cavity includes the tailpipe 67, in which a quarter wavelength acoustic standing wave may be established in accordance with fundamental open pipe theory. A velocity antinode V occurs at the open or tail end of the pipe, from which gases are discharged into the open end 53 of chamber 51, from which they may be conducted to a noise muffler or silencer.

Referring now to FIG. 4, the embodiment of FIG. 1 incorporated into he exhaust system of an engine is illustrated. The exhaust gases of engine 71 are coupled from engine exhaust manifold 70 to inlet 15 of the afterburner by means of pipe 72. The outlet pipe 37 of the afterburner is coupled to muffler 73 which in turn is coupled to exhaust tail pipe 74.

Thus, this invention provides means for increasing the efficiency of operation of a catalytic afterburner for an internal combustion engine by incorporating an acoustical standing wave vibration system in such an afterburner in a manner such that acoustical energy is utilized to clean the catalytic surfaces and to aid in the recombustion of the engine exhaust.

I claim:

1. An afterburner for combusting the exhaust gases of an engine comprising:
   combustion chamber means having a catalytic material therein for aiding the combustion of said gases and comprising a pair of combustion chambers having inlet and outlet ends,
   first conduit means for coupling said exhaust gases from said engine to said combustion chamber, said first conduit means interconnecting the inlet ends of said chambers, and
   second conduit means for coupling combustion products away from said chamber, said second conduit means interconnecting the outlet ends of said combustion chambers, said afterburner thereby forming a closed loop,
   said first and second conduit means being in the form of U-tubes,
   said combustion chamber means and said conduit means forming an acoustically resonant standing wave vibration system whereby the acoustical energy developed in said system cleans the catalytic material and enhances the combustion of the gases.

2. The afterburner of claim 1 and further including means for pumping gas through said system comprising gas inlet means proximate to the inner radius of the U-tube of said first conduit means for sucking gas into said tube and gas outlet means proximate to the outer radius of the U-tube of said second conduit means for drawing gas out of said tube.

3. An afterburner for combusting the exhaust gases of an engine comprising:
   combustion chamber means having a catalytic material therein for aiding the combustion of said gases and comprising a pair of combustion chambers having inlet and outlet ends,
   first conduit means for coupling said exhaust gases from said engine to said combustion chamber, said first conduit means interconnecting the inlet ends of said chambers,
   second conduit means for coupling combustion products away from said chamber, said second conduit means interconnecting the outlet ends of said combustion chambers, said afterburner thereby forming a closed loop, and
   trap means for trapping solid particles, said trap means being located in the outer wall of said second conduit means,
   said combustion chamber means and said conduit means forming an acoustically resonant standing wave vibration system, said first conduit means having an inlet substantially at a velocity antinode of the standing waver pattern of said system, said second conduit means including an outlet substantially at a velocity antinode of said system, pressure antinodes of said system appearing in the regions of said combustion chambers, whereby the acoustical energy developed in said system cleans the catalytic material and enhances the combustion of the gases.

4. An afterburner for combusting the exhaust gases of an engine comprising:
   combustion chamber means having a catalytic material therein for aiding the combustion of said gases,
   first conduit means for coupling said exhaust gases from said engine to said combustion chamber, and
   second conduit means for coupling combustion products away from said chamber,
   said first and second conduit means including a housing coupled to said engine to receive the exhaust thereof, said combustion chamber means comprising a burner pipe contained within said housing, said housing having an outlet for discharging the combustion products of said burner pipe,
   said combustion chamber means and said conduit means forming an acoustically resonant standing wave vibration system whereby the acoustical energy developed in said system cleans the catalytic material and enhances the combustion of the gases.

5. In an internal combustion engine, an afterburner forming an acoustical standing wave vibration system for combusting the exhaust gases of said engine comprising:
   first and second similar combustion chambers having inlet and outlet ends,
   said combustion chambers having catalytic material therein for aiding the combustion of said exhaust gases,
   a first conduit in he form of a U-tube interconnecting the inlet ends of said chambers,
   inlet means for coupling said first conduit to said engine to receive the exhaust gases thereof, and
   a second conduit in the form of a U-tube interconnecting the outlet ends of said chambers, and
   outlet means for carrying off combusted gases from said second conduit,
   the standing wave pattern of said vibration system being distributed along said conduits and said combustion chambers with pressure antinodes appearing in said chambers and velocity antinodes appearing substantially at the inlet and outlet means of said first and second conduits respectively, the said chambers being in phase opposition relationship.

6. The combination of claim 5 and additionally including trap means for trapping solid particulate material, said trap means being located in the wall of an outer portion of said second conduit.

7. The combination of claim 5 wherein the inlet means of said first conduit is located proximate to the inner portion of its U-tube and the outlet means of said second conduit is located proximate to the outer portion its U-tube thereby causing gas to be drawn into said inlet means and out of said outlet means.

* * * * *